US011167511B2

(12) United States Patent
Nicholson et al.

(10) Patent No.: US 11,167,511 B2
(45) Date of Patent: Nov. 9, 2021

(54) METHODS, SYSTEMS, AND APPARATUSES FOR FACILITATING MANUFACTURING A MECHANICAL TRANSFER (MT) OPTICAL FIBER CONNECTOR

(71) Applicants: Anthony Nicholson, Alpharetta, GA (US); Vernon Ken Anderson, Buford, GA (US)

(72) Inventors: Anthony Nicholson, Alpharetta, GA (US); Vernon Ken Anderson, Buford, GA (US)

( * ) Notice: Subject to any disclaimer, the term of this patent is extended or adjusted under 35 U.S.C. 154(b) by 239 days.

(21) Appl. No.: 16/534,758

(22) Filed: Aug. 7, 2019

(65) Prior Publication Data
US 2021/0039342 A1 Feb. 11, 2021

(51) Int. Cl.
*B29D 11/00* (2006.01)
*G02B 6/38* (2006.01)
*B29K 63/00* (2006.01)

(52) U.S. Cl.
CPC .... *B29D 11/0075* (2013.01); *B29D 11/00961* (2013.01); *G02B 6/3865* (2013.01); *B29K 2063/00* (2013.01)

(58) Field of Classification Search
CPC .......... B29D 11/0075; B29D 11/00961; G02B 6/3865; B29K 2063/00
See application file for complete search history.

(56) References Cited

U.S. PATENT DOCUMENTS

| 2007/0206288 | A1* | 9/2007 | Jacobowitz | B29D 11/00365 359/619 |
| 2008/0131791 | A1* | 6/2008 | Cho | B82Y 40/00 430/5 |
| 2011/0056310 | A1 | 3/2011 | Kaneda et al. | |
| 2016/0282250 | A1 | 9/2016 | Yamaguchi et al. | |

FOREIGN PATENT DOCUMENTS

CN 103630973 B 3/2014
WO WO2017208958 12/2017

* cited by examiner

*Primary Examiner* — Mathieu D Vargot

(57) ABSTRACT

An apparatus for facilitating manufacturing an optical fiber connector termination is disclosed. The apparatus may include a resin dispenser configured for dispensing a resin and including a resin dispenser outlet configured to be coupled with a resin inlet of a molded part. Further, the apparatus may include a vacuum generator configured for generating a negative pressure. Further, the vacuum generator may include a vacuum generator outlet configured to be coupled to at least one vacuum outlet of the molded part. Further, the vacuum generator may be configured for generating the negative pressure utilizing electrical energy. Further, the apparatus may include a controller electrically coupled to each of the resin dispenser and the vacuum generator. Further, the controller may be configured for controlling operation of the resin dispenser and the vacuum generator. Further, controlling operation of the vacuum generator may be based on at least one characteristic of the resin.

19 Claims, 15 Drawing Sheets

METHODS, SYSTEMS, AND APPARATUSES FOR FACILITATING MANUFACTURING A MECHANICAL TRANSFER (MT) OPTICAL FIBER CONNECTOR

FIELD OF THE INVENTION

The present disclosure relates generally to the field of plastic and nonmetallic article shaping or treating. More specifically, the present disclosure describes methods, systems, and apparatuses for facilitating manufacturing an optical fiber connector termination.

BACKGROUND OF THE INVENTION

Mechanical transfer (MT) optical fiber connectors such as Multi-fiber Push On (MPO) or MTP® are generally manufactured using molding techniques, typically by injecting a resin into a mold (ferrule). Further, the epoxy resin may need to be completely filled in all areas of micro-hole structures inside the ferrule before inserting optical fibers into the optical fiber connectors. Further, to ensure that the epoxy resin has completely filled all the areas of micro-hole structures inside the ferrule, a vacuum is used to draw the epoxy resin through the micro-hole structures until the resin forms a bead on a front face of the ferrule.

Failure to completely fill all areas of the micro hole structure may result in failure to bond the epoxy correctly to the glass fibers resulting in possible excess stress and related issues such as "core cracking". Excessive or underfill of the MT ferrule can also result in issues of downfield operations such as unsuccessful use of a laser or mechanical cleaver used to precisely cut the fiber before the polishing steps.

Currently, a dispenser to dispense the resin is used along with a vacuum pump with an on/off switch. However, using the vacuum to draw the resin through the micro-hole structures inside the ferrule is completely manual, and therefore dependent on an operator of the vacuum, leading to an inconsistent filling of the micro-hole structures inside the ferrule.

Further, the viscosity of the resin tends to change with time requiring a slightly longer vacuum cycle as time progresses, also potentially leading to an inconsistent filling of the micro-hole structures inside the ferrule.

Therefore, there is a need for improved methods, systems, and apparatuses for facilitating an optical fiber connector termination that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, an apparatus for facilitating manufacturing an optical fiber connector termination is disclosed. The apparatus may include a resin dispenser configured for dispensing a resin. Further, the resin dispenser may include a resin dispenser outlet configured to be coupled with a resin inlet of a molded part. Further, the resin dispenser may be configured for dispensing the resin utilizing electrical energy. Further, the apparatus may include a vacuum generator configured for generating a negative pressure. Further, the vacuum generator may include a vacuum generator outlet configured to be coupled to at least one vacuum outlet of the molded part. Further, the vacuum generator may be configured for generating the negative pressure utilizing electrical energy. Further, the apparatus may include a controller electrically coupled to each of the resin dispenser and the vacuum generator. Further, the controller may be configured for controlling operation of the resin dispenser and the vacuum generator. Further, controlling operation of the vacuum generator may be based on at least one characteristic of the resin.

According to some aspects, an apparatus for facilitating manufacturing an optical interconnect configured for interconnecting a first optical system to a second optical system is disclosed. The apparatus may include a resin dispenser configured for dispensing a resin. Further, the apparatus may include a vacuum generator configured for generating a negative pressure. Further, the apparatus may include a laser generator configured for generating a laser beam directed towards the resin inlet of the molded part to aid in dispenser alignment. Further, the laser beam may be configured to facilitate curation of the resin. Further, the apparatus may include a controller electrically coupled to each of the resin dispenser, the vacuum generator, the laser generator, and the storage device. Further, the controller may be configured for controlling operation of the resin dispenser and the vacuum generator. Further, controlling operation of the vacuum generator may be based on the at least one characteristic of the resin. Further, the at least one characteristic may include viscosity. Further, the apparatus may include a power connector configured to be electrically coupled with an electrical power source configured for providing electrical energy to operate each of the resin dispenser, the vacuum generator, the storage device, and the controller.

According to some aspects, a method for facilitating manufacturing of an optical interconnect configured for interconnecting a first optical system to a second optical system is disclosed. Further, the method may include retrieving, using a storage device, operation data corresponding to at least one characteristic of a resin. Further, the method may include activating, using a controller, a resin dispenser for a dispensing time period based on the operation data. Further, the method may include activating, using the controller, a vacuum generator for a vacuum time period based on the operation data. Further, activating the vacuum generator may be subsequent to an end of the dispensing time period. Further, the vacuum time period may be based on the at least one characteristic.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
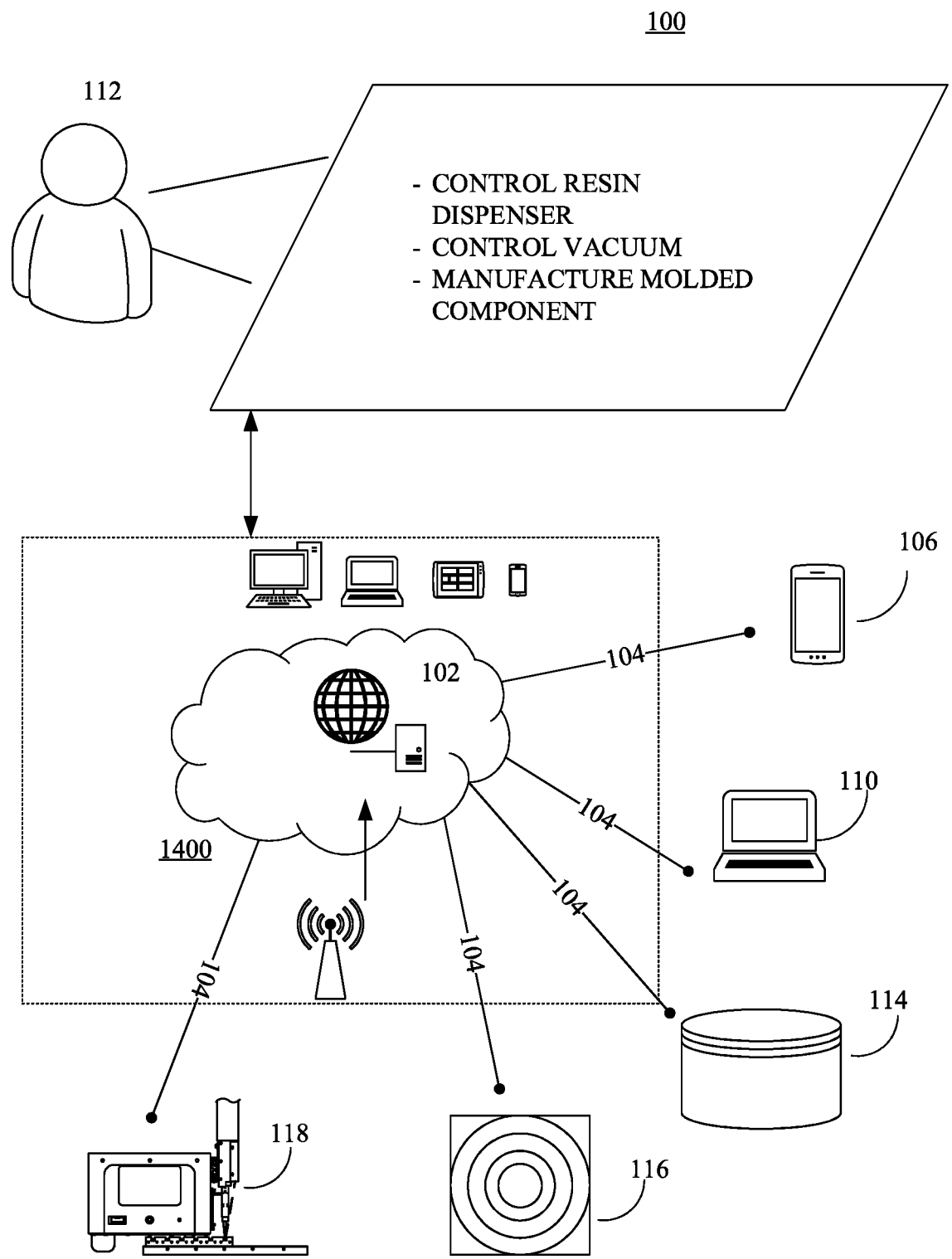
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of manufacturing a molded component, embodiments of the present disclosure are not limited to use only in this context.

FIG. 1 is an illustration of an online platform 100 consistent with various embodiments of the present disclosure. By way of non-limiting example, the online platform 100 to facilitate manufacturing a molded component may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, actuators (not shown) and an apparatus 118 over a communication network 104, such as, but not limited to, the Internet. Further, users of the online platform 100 may include relevant parties such as, but not limited to, end users, manufacturers, and administrators. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1500.

According to some embodiments, the online platform 100 may be configured to facilitate manufacturing a molded component. Further, the online platform 100 may communicate with a system to manufacture a molded component, including an integrated epoxy dispenser and vacuum pump controlled by an HMI/PLC. The system may automatically dispense a programmed amount of epoxy followed by a time-controlled vacuum. Using algorithms, the vacuum time duration may be automatically adjusted for changes on viscosity of epoxy during pot life of the epoxy. The parameters used in the algorithms may be edited by the user for the characteristic of the epoxy being used.

Figure 2:
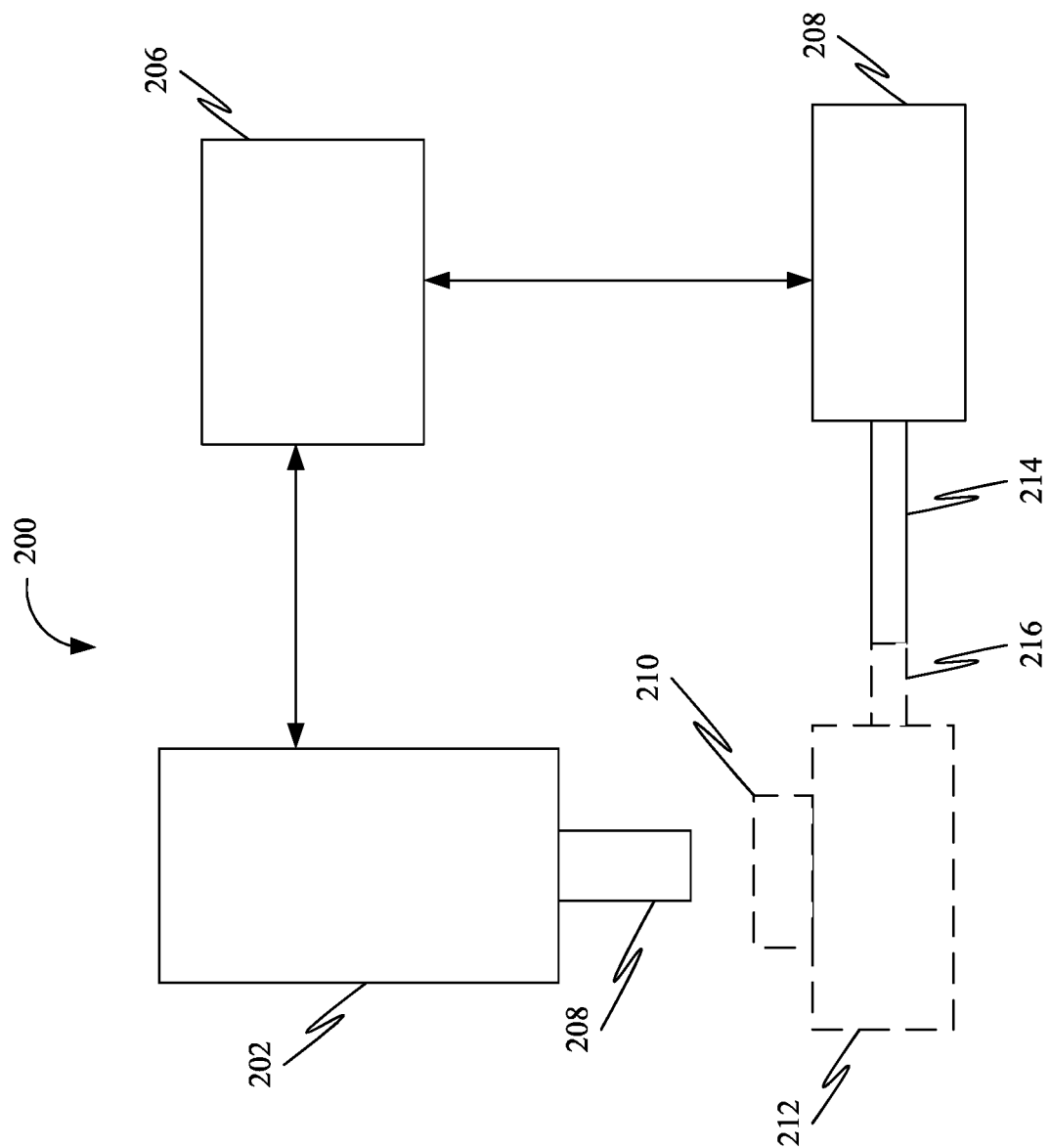
FIG. 2 is an apparatus for facilitating manufacturing a molded component, in accordance with some embodiments.

FIG. 2 is an apparatus 200 for facilitating manufacturing a molded component. Further, the apparatus 200 may include a resin dispenser 202 configured for dispensing a resin. Further, the resin may include an epoxy resin. Further, the resin dispenser 202 may include a resin dispenser outlet 208 configured to be coupled with a resin inlet 210 of a molded part 212. Further, the resin dispenser 202 may be configured for dispensing the resin utilizing electrical energy. Further, the resin may include an epoxy resin, such as one or more of Bisphenol A epoxy resin, Bisphenol F epoxy resin, Bisphenol F epoxy resin, Cycloaliphatic epoxy resin, Glycidylamine epoxy resin, and so on. Further, the resin may be cured, such as by reacting the epoxy resin with itself (homopolymerization) or by forming a copolymer with polyfunctional curatives or hardeners, such as amines, acids, acid anhydrides, phenols, alcohols, and thiols.

Further, the apparatus 200 may include a vacuum generator 208 configured for generating a negative pressure. Further, the vacuum generator 208 may include a vacuum generator outlet 214 configured to be coupled to at least one vacuum outlet 216 of the molded part 212. Further, the vacuum generator 208 may be configured for generating the negative pressure utilizing electrical energy.

Further, the apparatus 200 may include a controller 206 electrically coupled to each of the resin dispenser 202 and the vacuum generator 208. Further, the controller 206 may be configured for controlling operation of the resin dispenser 202 and the vacuum generator 208. Further, controlling operation of the vacuum generator 208 may be based on at least one characteristic of the resin.

In some embodiments, the apparatus 200 may further include a laser generator configured for generating a laser beam directed towards the resin inlet 210 of the mold 212. Further, the laser beam may be configured to facilitate curation of the resin. Further, the laser generator may be configured for generating the laser beam utilizing electrical energy. Further, the controller 206 may be electrically coupled to the laser generator. Further, the controller 206 may be further configured for controlling operation of the laser generator.

In some embodiments, the molded part 212 may include a ferrule including a micro-hole structure.

In some embodiments, the resin dispenser 202 may include a solenoid driven syringe. Further, the syringe may include the resin dispenser outlet 208. Further, the resin dispenser outlet 208 may include a dispenser tip.

In some embodiments, the apparatus 200 may further include a storage device including operation data corresponding to at least one characteristic of the resin. Further, the controller 206 may be communicatively coupled to the storage device.

In some embodiments, the at least one characteristic may include a viscosity. Further, the viscosity of the resin may be based on an age of the resin. Further, the storage device may include a plurality of vacuum time periods corresponding to a plurality of ages of the resin. Further, the controller 206 may be configured for determining the age of the resin based on a time elapsed since a refilling operation associated with the resin. Further, the refilling operation may include introducing the resin into a resin compartment of the resin dispenser 202. Further, the controller 206 may be configured for retrieving the vacuum time period from the storage device based on the age.

In some embodiments, the controller 206 may be configured for activating the resin dispenser 202 for a dispensing time period based on the operation data. Further, the controller 206 may be configured for activating the vacuum generator 208 for a vacuum time period based on the operation data. Further, the activating of the vacuum generator 208 may be initiated upon an end of the dispensing time period.

In some embodiments, the apparatus 200 may further include an input device configured for receiving a resin identifier associated with the resin. Further, the input device may be communicatively coupled with the controller 206. Further, the storage device may include a plurality of characteristics corresponding to a plurality of resin identifiers associated with a plurality of resins. Further, the plurality of resin identifiers may include the resin identifier. Further, the controller 206 may be configured for retrieving the at least one characteristic of the resin from the storage device based on the resin identifier.

In some embodiments, the apparatus 200 may further include at least one sensor configured for sensing the at least one characteristic of the resin. Further, the controller 206 may be communicatively coupled to the at least one sensor.

Figure 3:
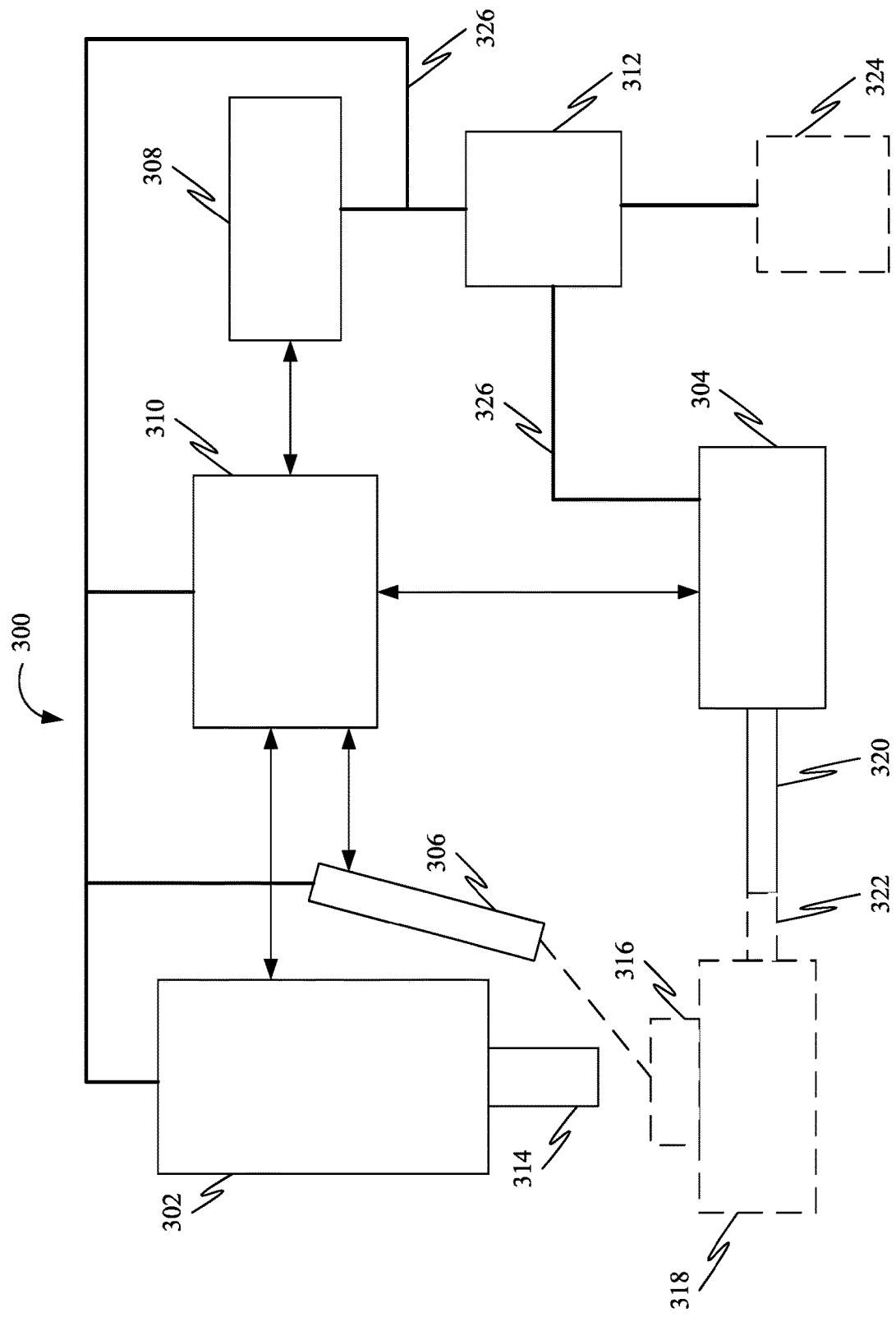
FIG. 3 is an apparatus for facilitating manufacturing an optical interconnect configured for interconnecting a first optical system to a second optical system, in accordance with some embodiments.

FIG. 3 is an apparatus 300 for facilitating manufacturing an optical interconnect configured for interconnecting a first optical system to a second optical system. Further, the apparatus 300 may include a resin dispenser 302 configured for dispensing a resin. Further, the resin may include an epoxy resin. Further, the resin dispenser 302 may include a resin dispenser outlet 314 configured to facilitate injection of the resin into a resin inlet 316 of a molded component 318. Further, the molded component 318 may include a ferrule including a micro-hole structure. Further, the resin dispenser outlet 314 may include a dispensing tip. Further, the resin dispenser 302 may be configured for dispensing the resin utilizing electrical energy.

Further, the apparatus 300 may include a vacuum generator 304 configured for generating a negative pressure. Further, the vacuum generator 304 may include a vacuum generator outlet 320 configured to be coupled to at least one vacuum outlet 322 of the molded part 318. Further, the vacuum generator 304 may be configured for generating the negative pressure utilizing electrical energy.

Further, the apparatus 300 may include a laser generator 306 configured for generating a laser beam directed towards the resin inlet 316 of the molded component 318. Further, the laser beam may be configured to facilitate curation of the resin. Further, the laser generator 306 may be configured for generating the laser beam utilizing electrical energy.

Further, the apparatus 300 may include a storage device 308 including operation data corresponding to at least one characteristic of the resin.

Further, the apparatus 300 may include a controller 310 electrically coupled to each of the resin dispenser 302, the vacuum generator 304, the laser generator 306 and the storage device 308. Further, the controller 310 may be configured for controlling operation of the resin dispenser 302 and the vacuum generator 304. Further, controlling operation of the vacuum generator 304 may be based on the at least one characteristic of the resin. Further, the at least one characteristic may include viscosity. Further, the controller 310 may be configured for activating the resin dispenser 302 for a dispensing time period based on the operation data. Further, the controller 310 may be configured for activating the vacuum generator 304 for a vacuum time period based on the operation data. Further, the activating of the vacuum generator 304 may be subsequent to the activating of the resin dispenser 302.

Further, the apparatus 300 may include a power connector 312 configured to be electrically coupled with an electrical power source 324 configured for providing electrical energy to operate each of the resin dispenser 302, the vacuum generator 304, the storage device 308 and the controller 310, such as through a power connection 326.

In some embodiments, the electrical power source may be electrically coupled to the resin dispenser 302 through a dispenser relay. Further, the controller 310 may be electrically coupled to the dispenser relay. Further, activating the resin dispenser 302 may include activating the dispenser relay. Further, the electrical power source may be electrically coupled to the vacuum generator 304 through a vacuum relay. Further, the controller 310 may be electrically coupled to the vacuum relay. Further, activating the vacuum generator 304 may include activating the vacuum relay. Further, the electrical power source may be electrically coupled to the laser generator 306 through a laser relay. Further, the controller 310 may be electrically coupled to the laser relay. Further, activating the laser generator 306 may include activating the laser relay.

In some embodiments, the apparatus 300 may further include an imaging device configured for capturing an image of a front face of the ferrule. Further, the imaging device may comprise a camera. Further, the imaging device may be communicatively coupled to the storage device 308. Further, the controller 310 may be configured for analyzing the image. Further, the image may be captured subsequent to the activating of the vacuum generator 304. Further, the controller 310 may be configured for determining formation of a resin bead on the front face of the ferrule based on the analyzing. Further, the controller 310 may be configured for deactivating the vacuum generator 304 based on determining the formation of the resin bead.

Further, in an embodiment, the imaging device may be configured for capturing an image of a back face of the ferrule. Further, the controller 310 may be configured for analyzing the image. Further, the image may be captured subsequent to the activating of the vacuum generator 304. Further, the controller 310 may be configured for determining a remaining amount of resin bead in the ferrule based on the analyzing. Further, the remaining amount of resin may correspond to the formation of the resin bead on the front face of the ferrule. Further, the controller 310 may be configured for deactivating the vacuum generator 304 based on determining the remaining amount of resin in the ferrule.

In some embodiments, the apparatus 300 may further include an input device configured for receiving a resin identifier associated with the resin. Further, the storage device 308 may include a plurality of characteristics corresponding to a plurality of resin identifiers associated with a plurality of resins. Further, the plurality of resin identifiers may include the resin identifier. Further, the controller 310 may be configured for retrieving the at least one characteristic of the resin from the storage device 308 based on the resin identifier.

In some embodiments, the apparatus 300 may further include an output device configured for presenting operational data corresponding to the apparatus 300.

In some embodiments, the viscosity of the resin may be based on an age of the resin. Further, the storage device 308 may include a plurality of vacuum time periods corresponding to a plurality of ages of the resin. Further, the controller 310 may be configured for determining the age of the resin based on a time elapsed since a refilling operation associated with the resin. Further, the refilling operation may include introducing the resin into a resin compartment of the resin dispenser 302. Further, the controller 310 may be configured for retrieving the vacuum time period from the storage device 308 based on the age.

In some embodiments, the at least one characteristic further may include a pot-life associated with the resin. Further, the controller 310 may be configured for comparing the age of the resin with the pot-life. Further, the controller 310 may be configured for deactivating the resin dispenser 302 based on a result of the comparing. Further, the result may include indication of the age exceeding the pot-life.

In some embodiments, the activating of the vacuum generator 304 may be subsequent to end of the dispensing time period.

In some embodiments, the controller 310 may be further configured for generating a time delay subsequent to end of the dispensing time period. Further, the activating of the vacuum generator 304 may be subsequent to elapse of the time delay.

In some embodiments, the storage device 308 further may include a mode indicator corresponding to a multicycle mode. Further, each cycle of the multicycle mode may include activating the resin dispenser 302 for the dispensing time period and activating the vacuum generator 304 for the vacuum time period. Further, the controller 310 may be configured for retrieving a number of cycles corresponding to the multicycle mode from the storage device 308. Further, the controller 310 may be configured for determining whether a cycle counter value may be equal to the number of cycles. Further, the controller 310 may be configured for deactivating each of the resin dispenser 302, the vacuum generator 304 and the laser generator 306 based on the cycle counter value being equal to the number of cycles.

Figure 4:
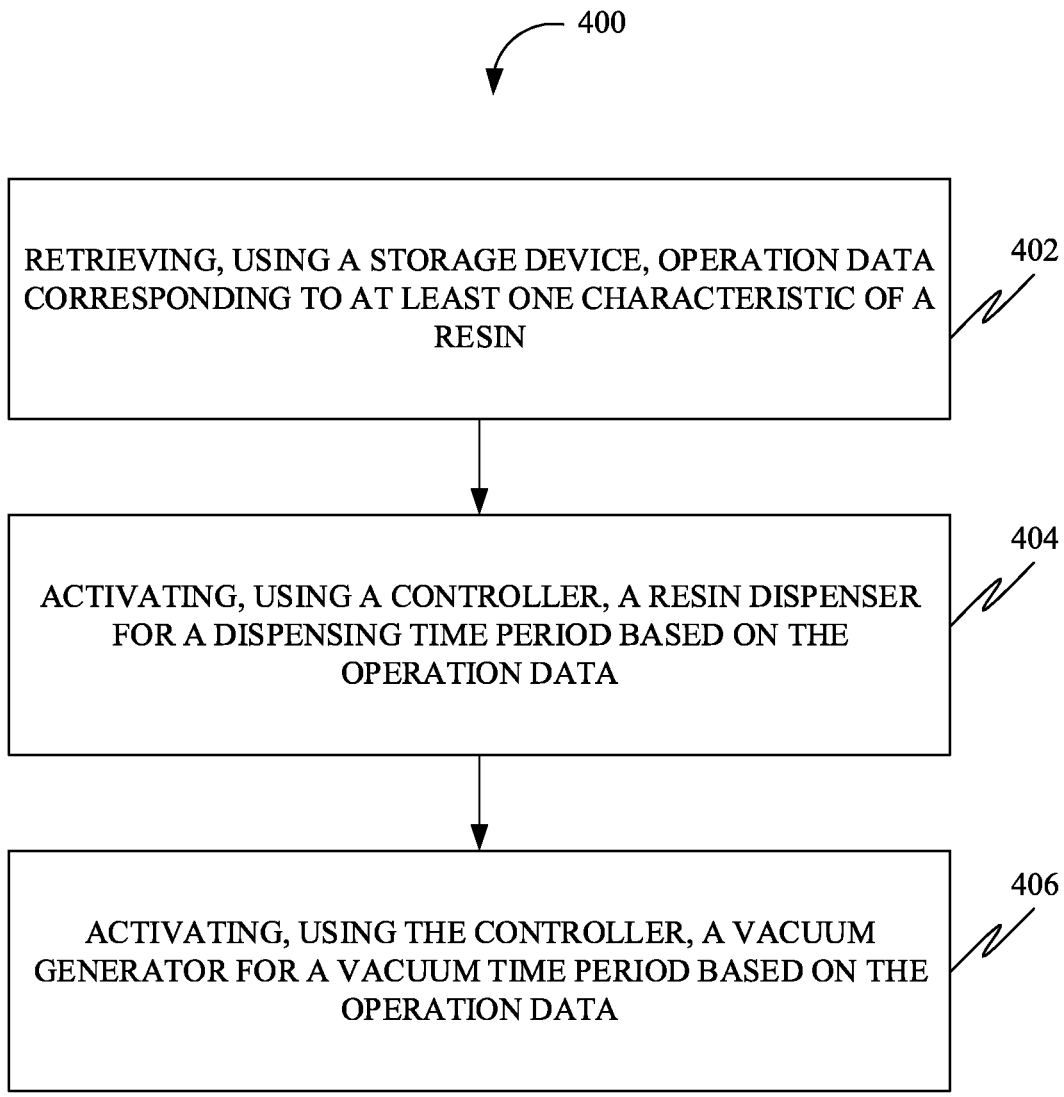
FIG. 4 is a method facilitating manufacturing of an optical interconnect configured for interconnecting a first optical system to a second optical system.

FIG. 4 is a method 400 facilitating manufacturing of an optical interconnect configured for interconnecting a first optical system to a second optical system. At 402, the method 400 may include retrieving, using a storage device, such as the storage device 308, operation data corresponding to at least one characteristic of a resin.

At 404, the method 400 may include activating, using a controller, such as the controller 310, a resin dispenser for a dispensing time period based on the operation data.

At 406, the method 400 may include activating, using the controller, a vacuum generator for a vacuum time period based on the operation data. Further, activating the vacuum generator may be subsequent to an end of the dispensing time period. Further, the vacuum time period may be based on the at least one characteristic.

Figure 5:
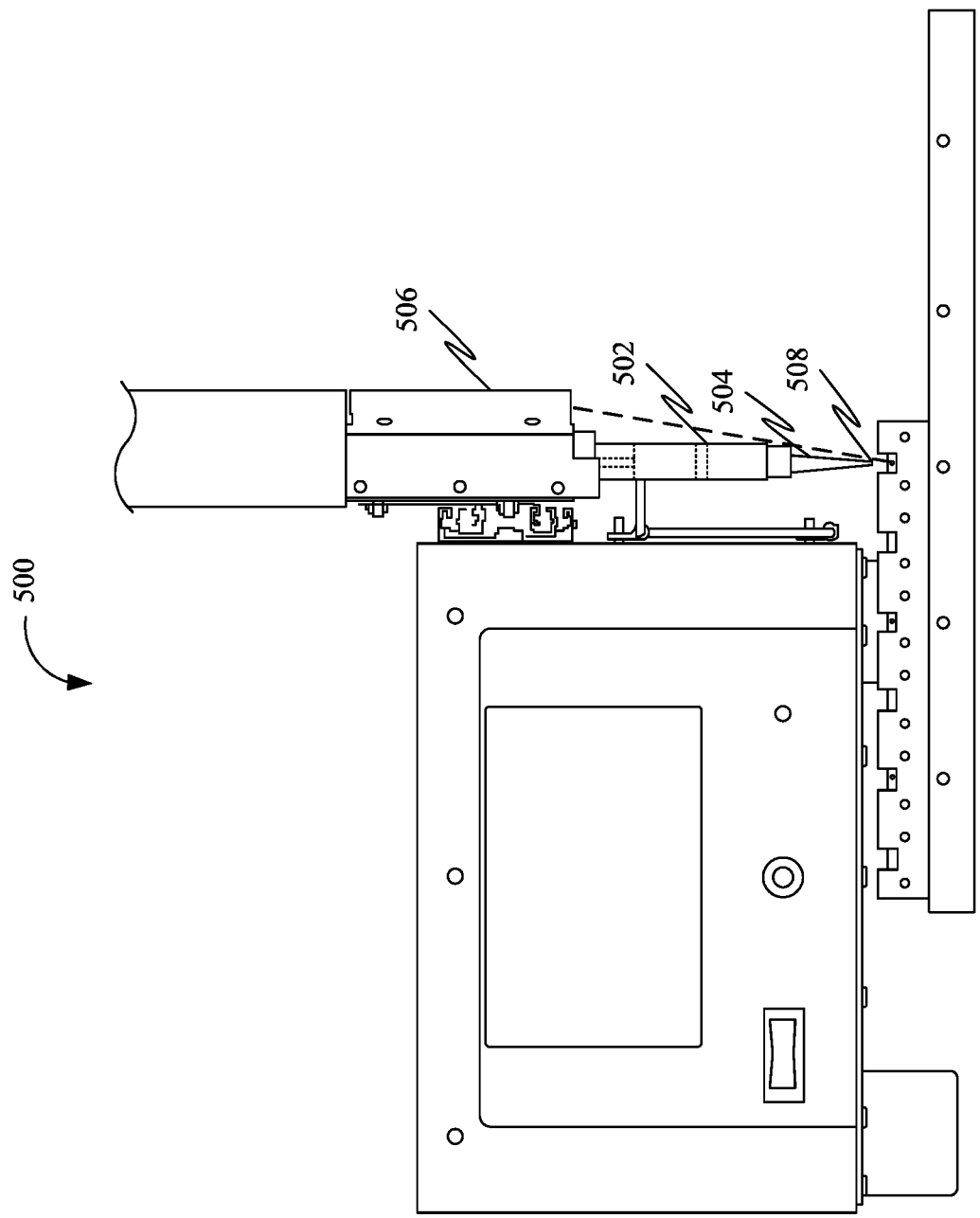
FIG. 5 is an apparatus for facilitating manufacturing an optical interconnect configured for interconnecting a first optical system to a second optical system.
Figure 6:
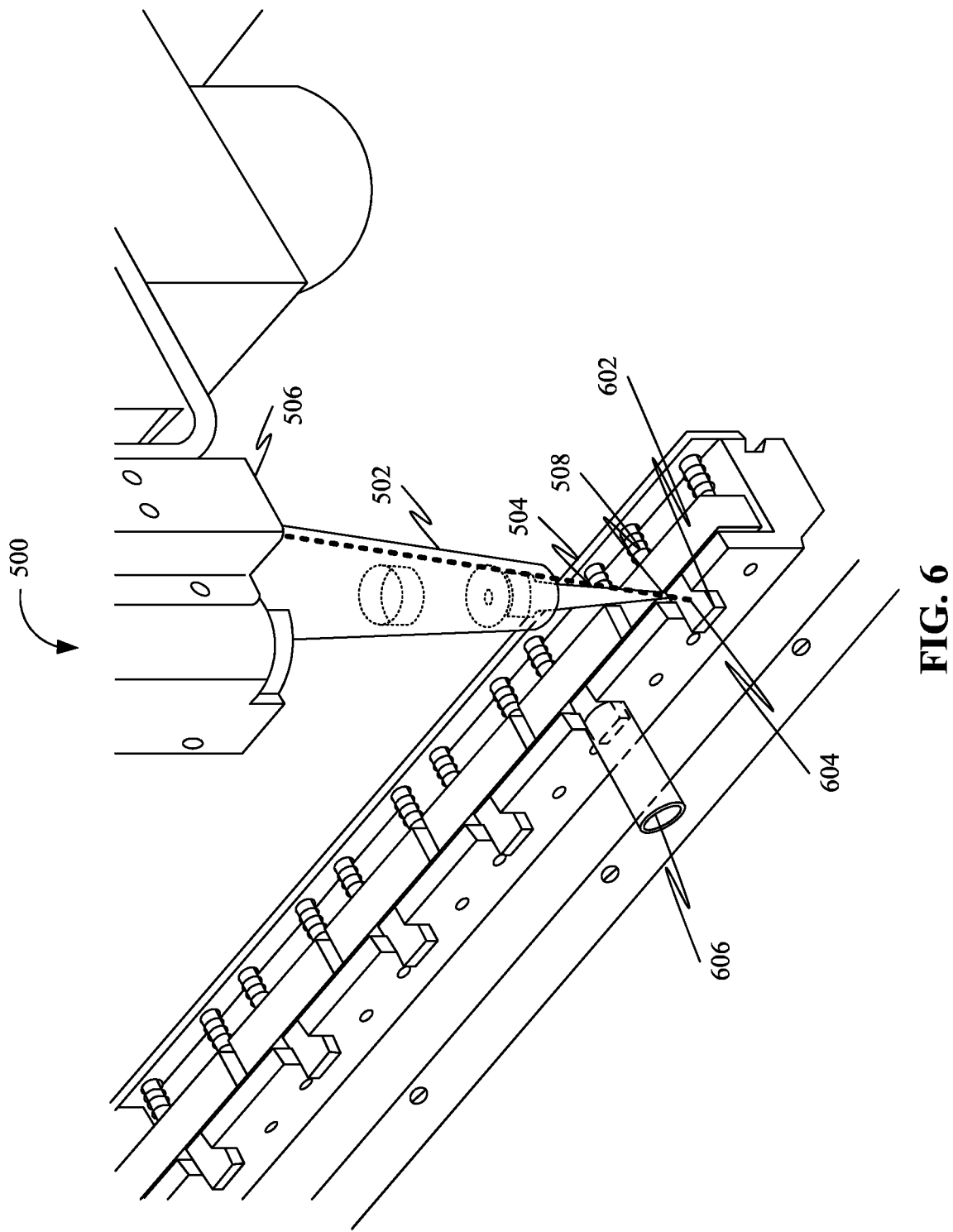
FIG. 6 is a side perspective close-up view of the apparatus of FIG. 5.

FIG. 5 is apparatus 500 for facilitating manufacturing an optical interconnect configured for interconnecting a first optical system to a second optical system. Further, FIG. 6 is a side perspective close-up view of the apparatus 500. Further, the apparatus 500 may include a resin dispenser 502 configured for dispensing a resin. Further, the resin may include an epoxy resin. Further, the resin dispenser 502 may include a resin dispenser outlet 504 configured to facilitate injection of the resin into a resin inlet 602 of a molded part 604 (as shown in FIG. 6). Further, the molded part 604 may include a ferrule including a micro-hole structure. Further, the resin dispenser outlet 504 may include a dispensing tip 508. Further, the resin dispenser 502 may be configured for dispensing the resin utilizing electrical energy.

Further, the apparatus 500 may include a vacuum generator configured for generating a negative pressure. Further, the vacuum generator may include a vacuum generator outlet 606 (as shown in FIG. 6) configured to be coupled to at least one vacuum outlet of the molded part 604. Further, the vacuum generator may be configured for generating the negative pressure utilizing electrical energy.

Further, the apparatus 500 may include a laser generator 506 configured for generating a laser beam directed towards the resin inlet of the molded part. Further, the laser beam may be configured to facilitate curation of the resin. Further, the laser generator 506 may be configured for generating the laser beam utilizing electrical energy.

Figure 7:
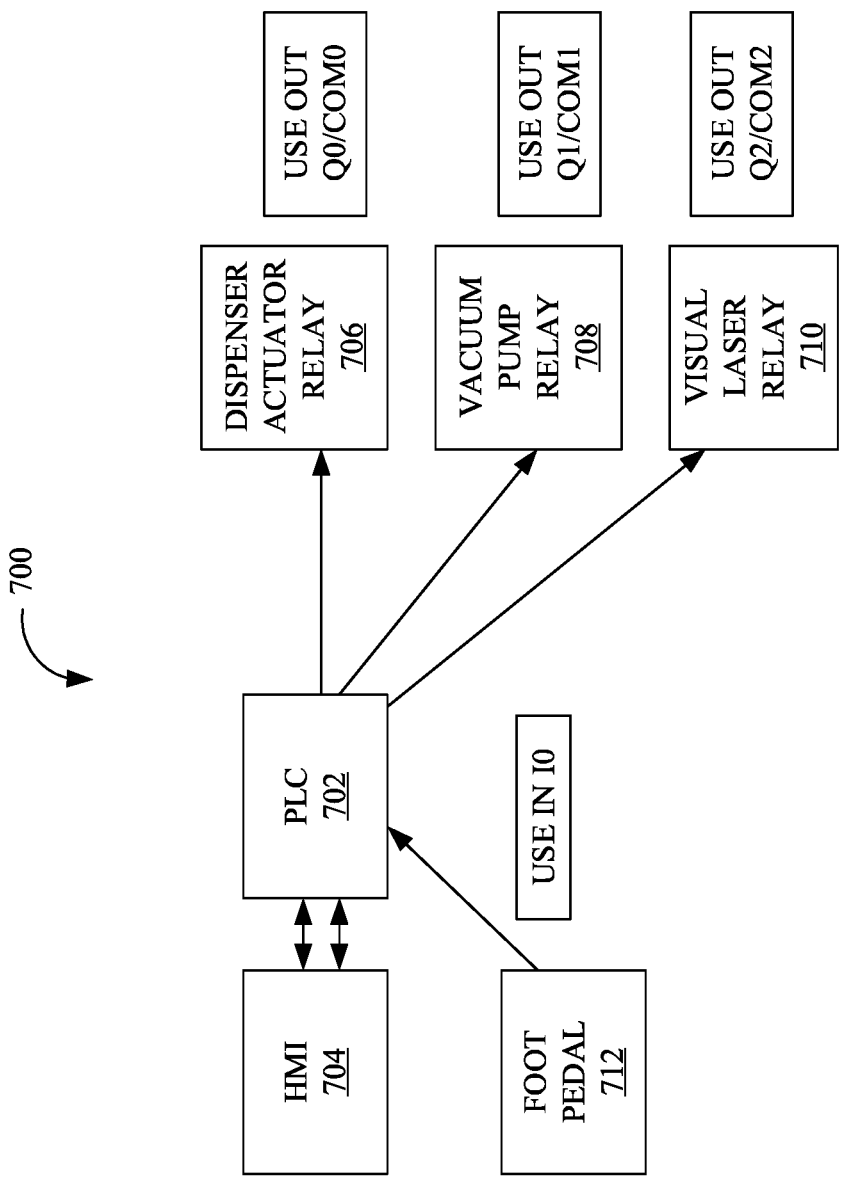
FIG. 7 is a block diagram representation of a system for facilitating manufacturing an optical interconnect configured for interconnecting a first optical system to a second optical system, in accordance with some embodiments.

FIG. 7 is a block diagram representation of a system 700 for facilitating manufacturing an optical interconnect configured for interconnecting a first optical system to a second optical system. Further, the system 700 may include a programming and logic controller (PLC) 702. Further, the PLC 702 may be connected to a human machine interface (HMI) 704 to receive input. Further, the PLC 702 may be connected to a display actuator relay 706, a vacuum pump relay 708, and a visual laser relay 710 to control the manufacturing of the optical interconnect. Further, the system 700 may include a foot pedal 712 to provide input to the PLC 702.

Figure 8:
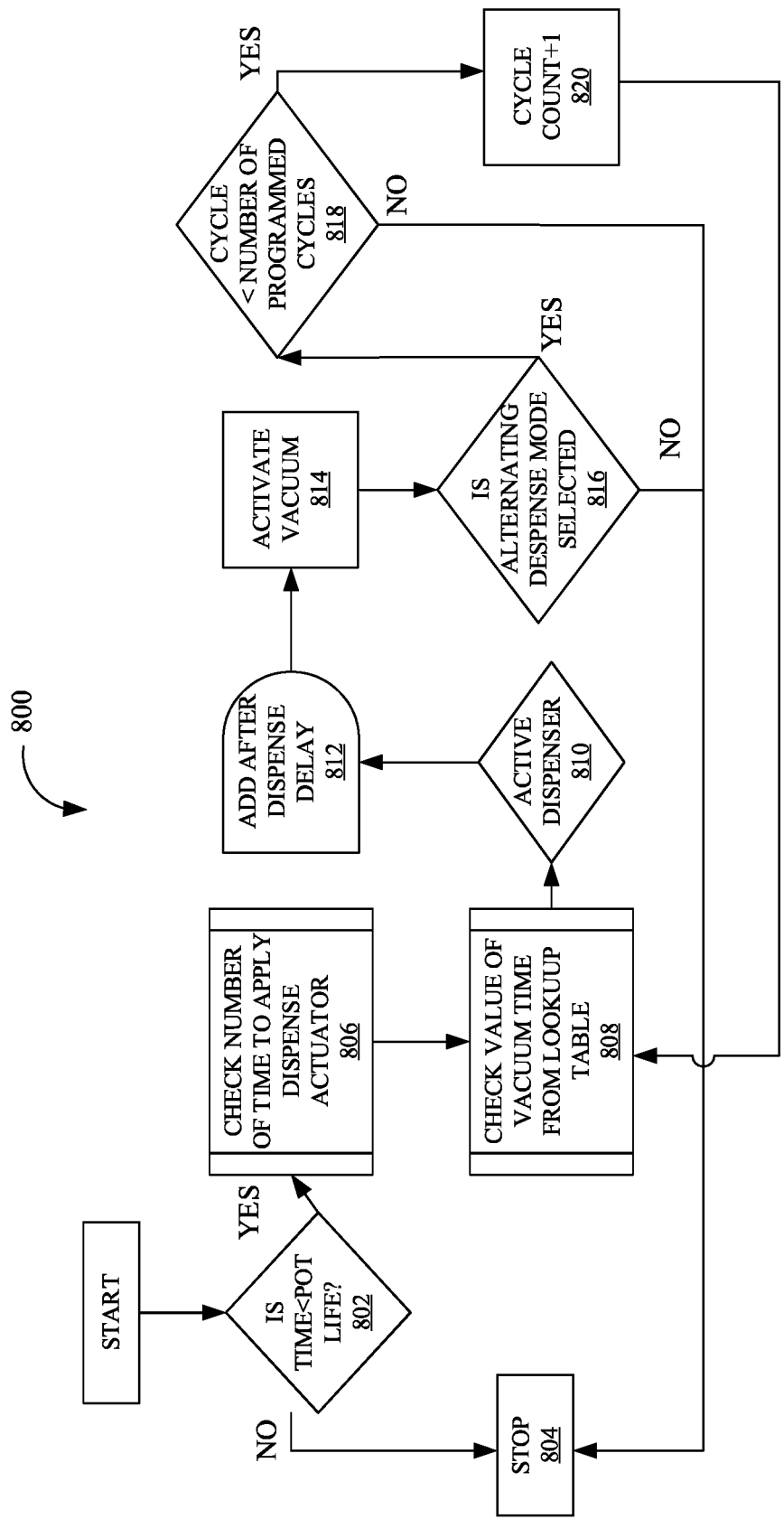
FIG. 8 is a method for facilitating manufacturing an optical interconnect configured for interconnecting a first optical system to a second optical system, in accordance with some embodiments.

FIG. 8 is a method 800, such as an algorithm implemented by a PLC (such as the PLC 702) for facilitating manufacturing an optical interconnect configured for interconnecting a first optical system to a second optical system.

At 802, the method 800 may include determining if time is less than pot life. If time is more than pot life, the method may reach stop 804.

If time is less than pot life, at 806, the method 800 may include checking a number of times to apply dispense actuator.

At 808, the method 800 may include checking value of vacuum time from lookup table.

At 810, the method 800 may include activating dispenser.

At 812, the method 800 may include adding after dispense delay.

At 814, the method 800 may include activating vacuum.

At 816, the method 800 may include determining if alternating dispense mode is selected. If alternating dispense mode is not selected, the method may reach stop 804.

If alternating dispense mode is selected, at 818, the method 800 may include determining if cycle number is less than a number of programmed cycles.

If cycle number is less than the number of programmed cycles, at 820, the method 800 may include increasing cycle count by 1.

If cycle number is not less than the number of programmed cycles, the method 800 may stop at 804.

Figure 9:
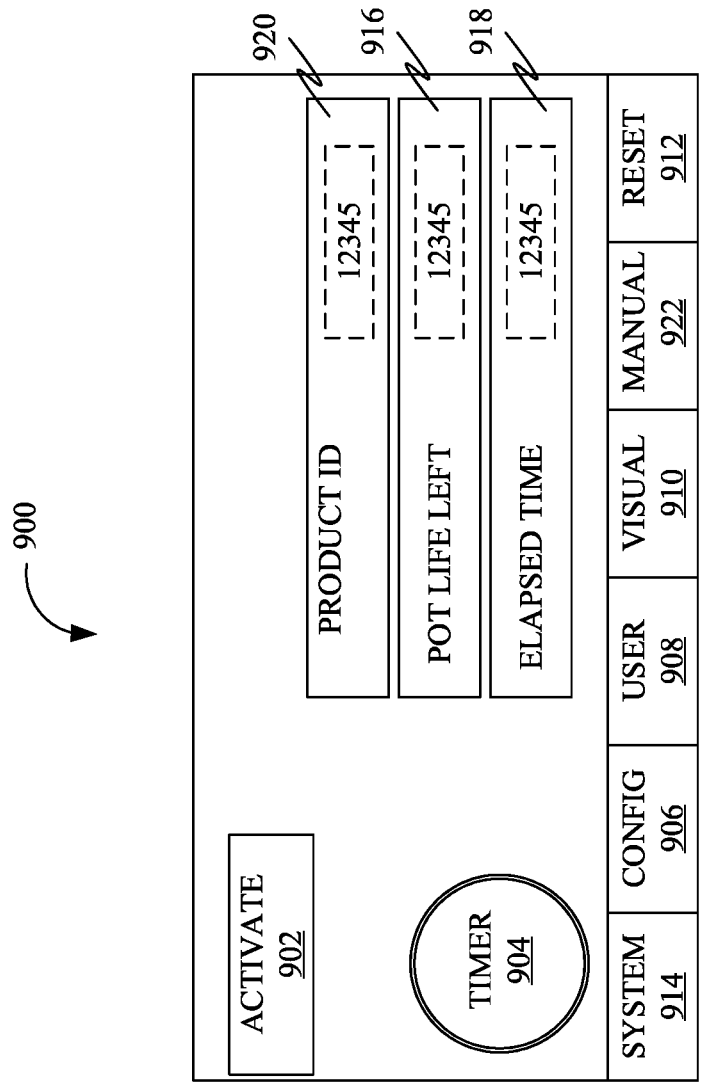
FIG. 9 is a home screen of a user interface of a system for facilitating manufacturing an optical interconnect configured for interconnecting a first optical system to a second optical system, in accordance with some embodiments.

FIG. 9 is a home screen 900 of a user interface of a system for facilitating manufacturing an optical interconnect configured for interconnecting a first optical system to a second optical system.

The home screen 900 may include an activate button 902 that may start dispense vacuum cycle. Vacuum time may be a formula using elapsed time contained in an epoxy viscosity configurator menu. Values loaded may depend on epoxy type chosen from a pull-down menu in a configuration screen. If pot life left is 0, activate may not be active.

Further, the home screen 900 may include a time button 904 that may start countdown clock based on the pot life variable for a product ID selected.

Further, the home screen 900 may include a config button 906 that may allow a user to go to the configuration screen.

Further, the home screen 900 may include a user button 908 that may allow a user to go to a password screen.

Further, the home screen 900 may include a visual toggle 910 that may activate a relay to turn on visual laser.

Further, the home screen 900 may include a reset button 912 that may reset the pot timer, and display an additional dialog box asking if user may be sure and may wish to reset the pot timer.

Further, the home screen 900 may include a system button 914 that may allow a user to enter system mode of HMI.

Further, the home screen 900 may include the pot timer 916 displaying remaining pot time, such as in hours and minutes.

Further, the home screen 900 may include an elapsed timer 918 showing elapsed time.

Further, the home screen 900 may include a product id display 920 displaying a unique product id, which may also allow saving of variables shown on the home screen 900 and to import and export the saved variables.

Further, the home screen 900 may include a manual button 922 to toggle a manual mode.

Figure 10:
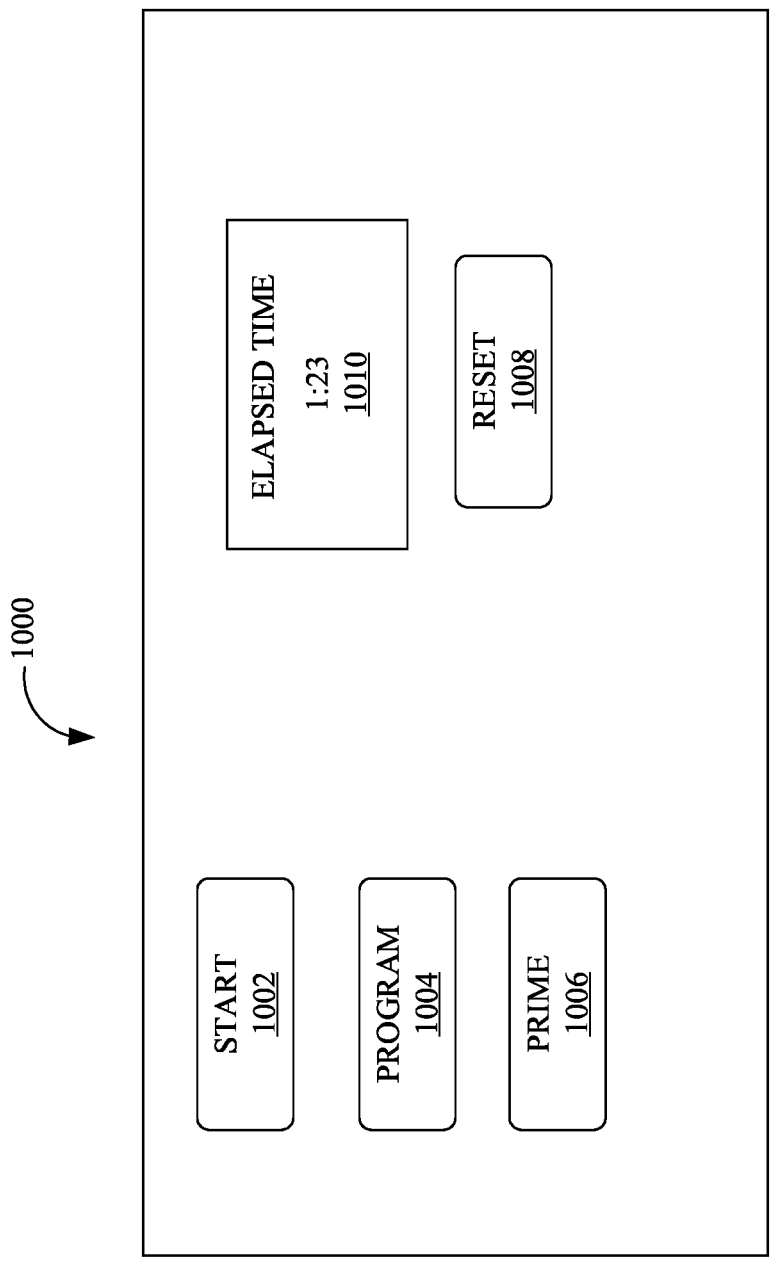
FIG. 10 is an exemplary home screen of a user interface of a system for facilitating manufacturing an optical interconnect configured for interconnecting a first optical system to a second optical system, in accordance with some embodiments.

FIG. 10 is an exemplary home screen 1000 of a user interface of a system for facilitating manufacturing an optical interconnect configured for interconnecting a first optical system to a second optical system. The home screen may include a start button 1002, a program button 1004, a prime button 1006, a reset button 1008, and an elapsed timer 1010.

Figure 11:
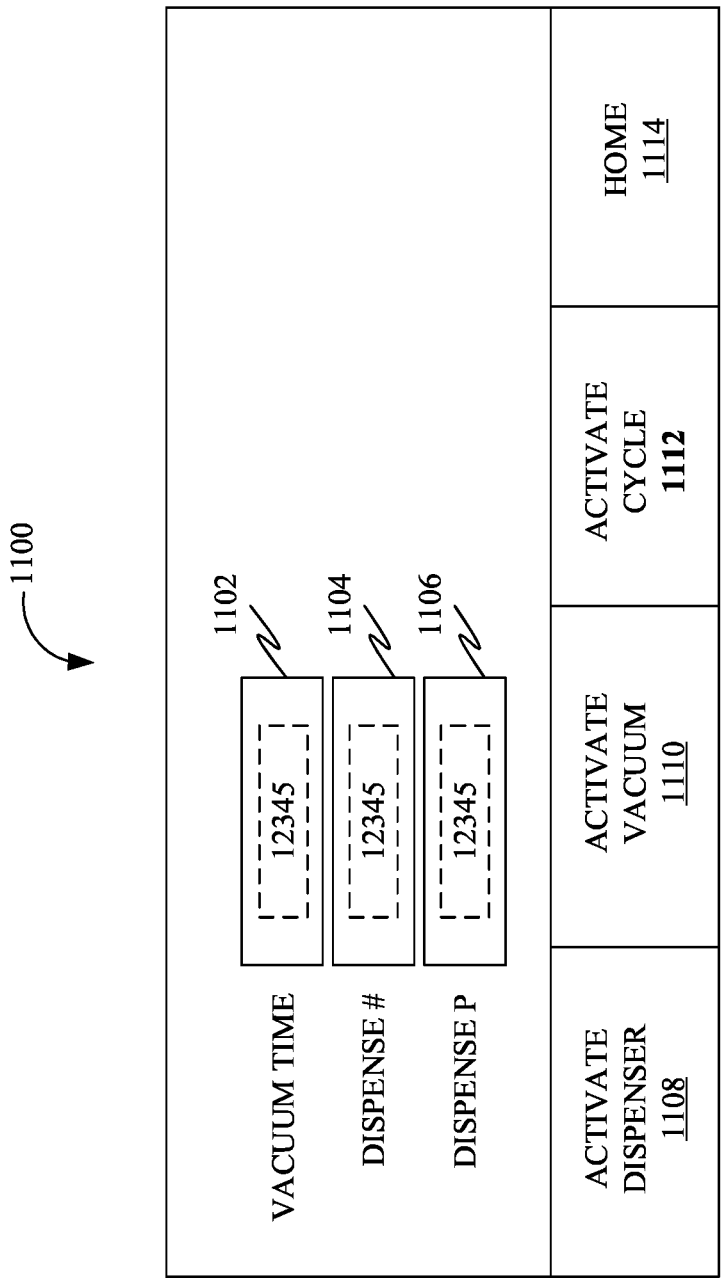
FIG. 11 is a manual mode screen of a user interface of a system for facilitating manufacturing an optical interconnect configured for interconnecting a first optical system to a second optical system, in accordance with some embodiments.

FIG. 11 is a manual mode screen 1100 of a user interface of a system for facilitating manufacturing an optical interconnect configured for interconnecting a first optical system to a second optical system.

The manual mode screen 1100 may include a vacuum time display 1102 showing a time at which vacuum may be activated.

Further, the manual mode screen 1100 may include a dispense number 1104 showing a number of times to engage relay on dispenser.

Further, the manual mode screen 1100 may include a dispense p seconds display 1106 showing a dispense pause time after application before starting vacuum. Further, the manual mode screen 1100 may include an activate dispenser button 1108 to activate dispenser only.

Further, the manual mode screen 1100 may include an activate vacuum button 1110 to activate vacuum only.

Further, the manual mode screen 1100 may include an activate cycle button 1112 to activate cycle only.

Further, the manual mode screen 1100 may include a home button 1114 to go to home screen.

Figure 12:
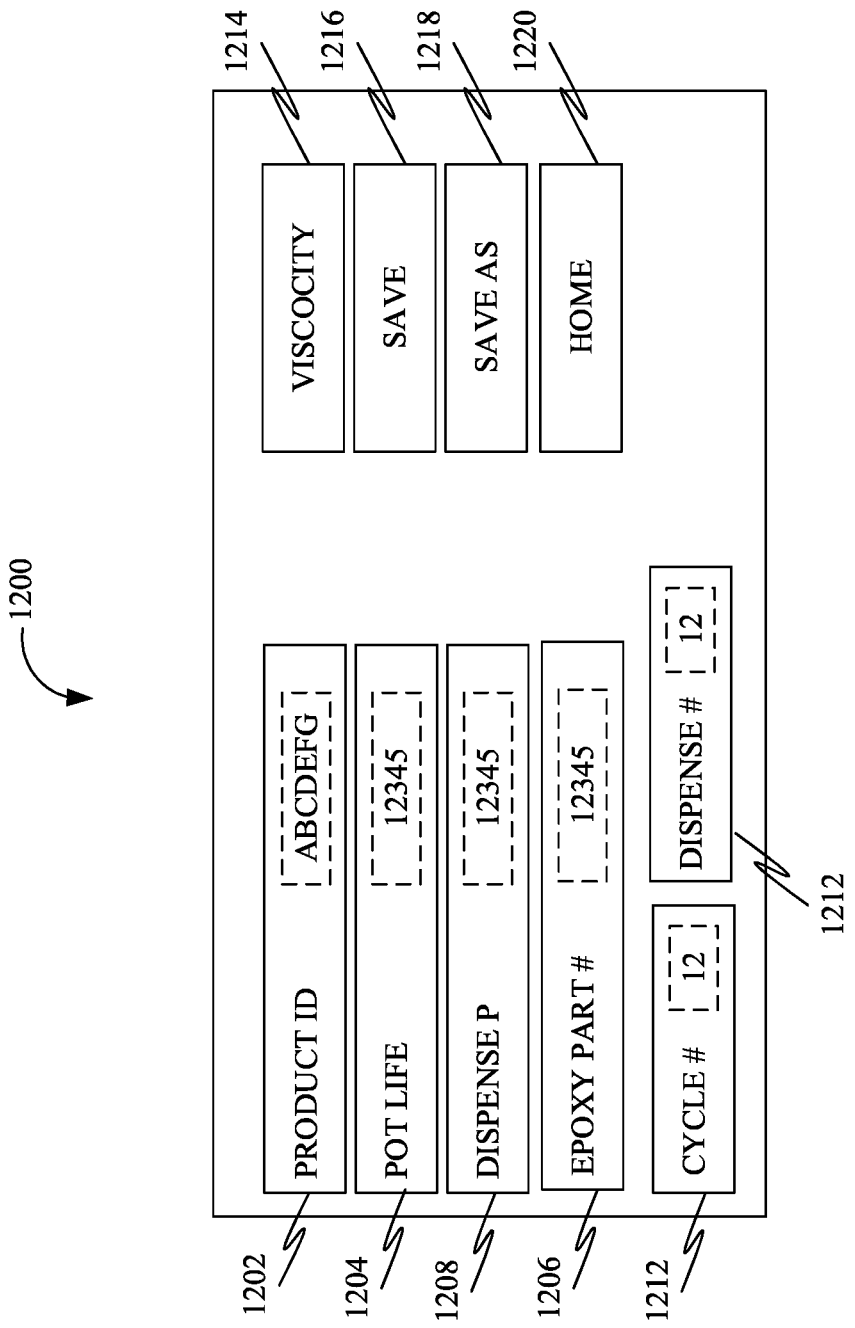
FIG. 12 is a configuration screen of a user interface of a system for facilitating manufacturing an optical interconnect configured for interconnecting a first optical system to a second optical system, in accordance with some embodiments.

FIG. 12 is a configuration screen 1200 of a user interface of a system for facilitating manufacturing an optical interconnect configured for interconnecting a first optical system to a second optical system.

Further, the configuration screen 1200 may include a product id display 1202 displaying a unique product id, which may also allow saving of variables shown on the configuration screen 1200 and to and export the saved variables.

Further, the configuration screen 1200 may include a pot life display 1204 showing a pot life of an epoxy being used.

Further, the configuration screen 1200 may include an epoxy part number 1206 including a pull-down menu displaying saved epoxy part numbers.

Further, the configuration screen 1200 may include a dispense p display 1208 showing a dispense pause time after application before starting vacuum.

Further, the configuration screen 1200 may include a dispense number 1210 showing a number of times to engage relay on dispenser before vacuum relay is triggered.

Further, the configuration screen 1200 may include a number of cycles 1212 showing a number to times to run dispense/vacuum cycle.

Further, the configuration screen 1200 may include a viscosity button 1214 to open submenu to enter polynomial parameters for epoxy type.

Further, the configuration screen 1200 may include a save button 1216 to save file as the current configuration file name.

Further, the configuration screen 1200 may include a save as button 1218 to enter a new file name to save as.

Further, the configuration screen 1200 may include a home button 1220 to go to home screen.

Figure 13:
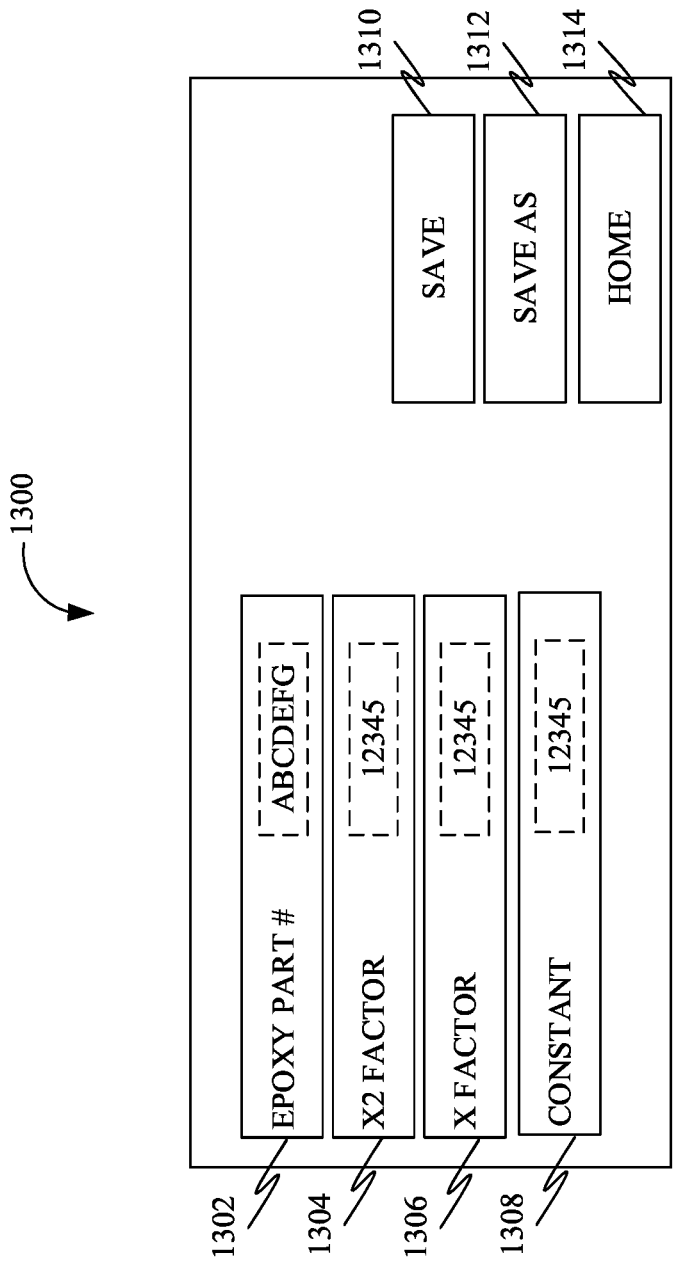
FIG. 13 is a viscosity screen of a user interface of a system for facilitating manufacturing an optical interconnect configured for interconnecting a first optical system to a second optical system, in accordance with some embodiments.

FIG. 13 is a viscosity screen 1300 of a user interface of a system for facilitating manufacturing an optical interconnect configured for interconnecting a first optical system to a second optical system.

Further, the viscosity screen 1300 may include an epoxy part number 1302 including a pull-down menu to select from list.

Further, the viscosity screen 1300 may include an X2 Factor 1304 including an x squared component in exponential function to calculate vacuum on time against elapsed time.

Further, the viscosity screen 1300 may include an X Factor 1306 including an X component in exponential function to calculate the vacuum on time against elapsed time.

Further, the viscosity screen 1300 may include a constant 1308 including a constant component in exponential function to calculate the vacuum on time against elapsed time.

Further, the viscosity screen 1300 may include a save button 1310 to Save parameters to file existing epoxy part number file name.

Further, the viscosity screen 1300 may include a save as button 1312 showing a pop-up screen to save the current parameters as a different epoxy part number file.

Further, the viscosity screen 1300 may include a home button 1314 to go to home screen, such as the home screen 900.

Figure 14:
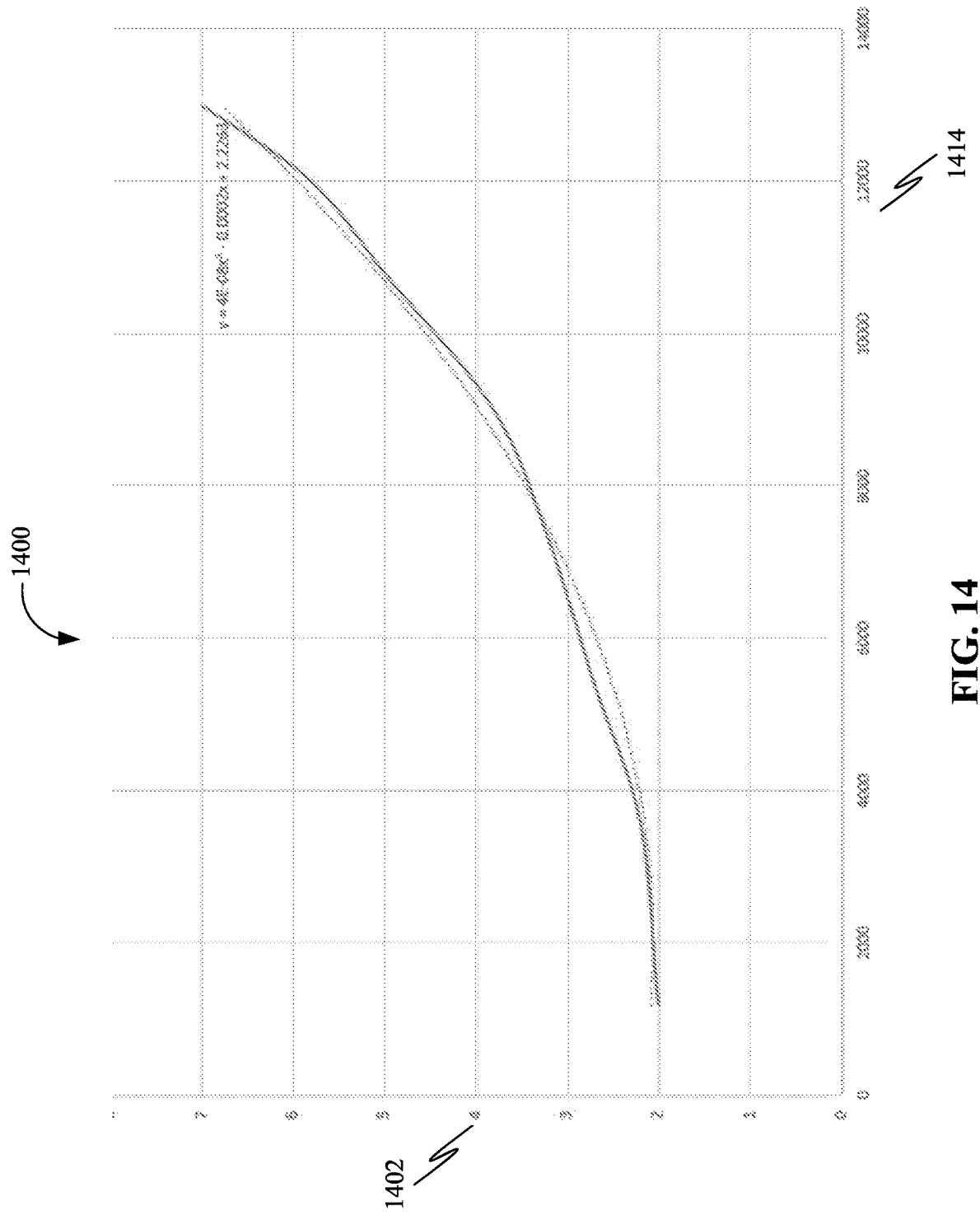
FIG. 14 is a viscosity curve to calculate vacuum pump rum time, in accordance with some embodiments.

FIG. 14 is a viscosity curve 1400 to calculate vacuum pump rum time, in accordance with some embodiments. Further, the viscosity curve 1400 may be plotted between vacuum pump run time depicted on vertical axis 1402 of the viscosity curve 1400, and elapsed time depicted on the horizontal axis 1404 of the viscosity curve 1400.

Figure 15:
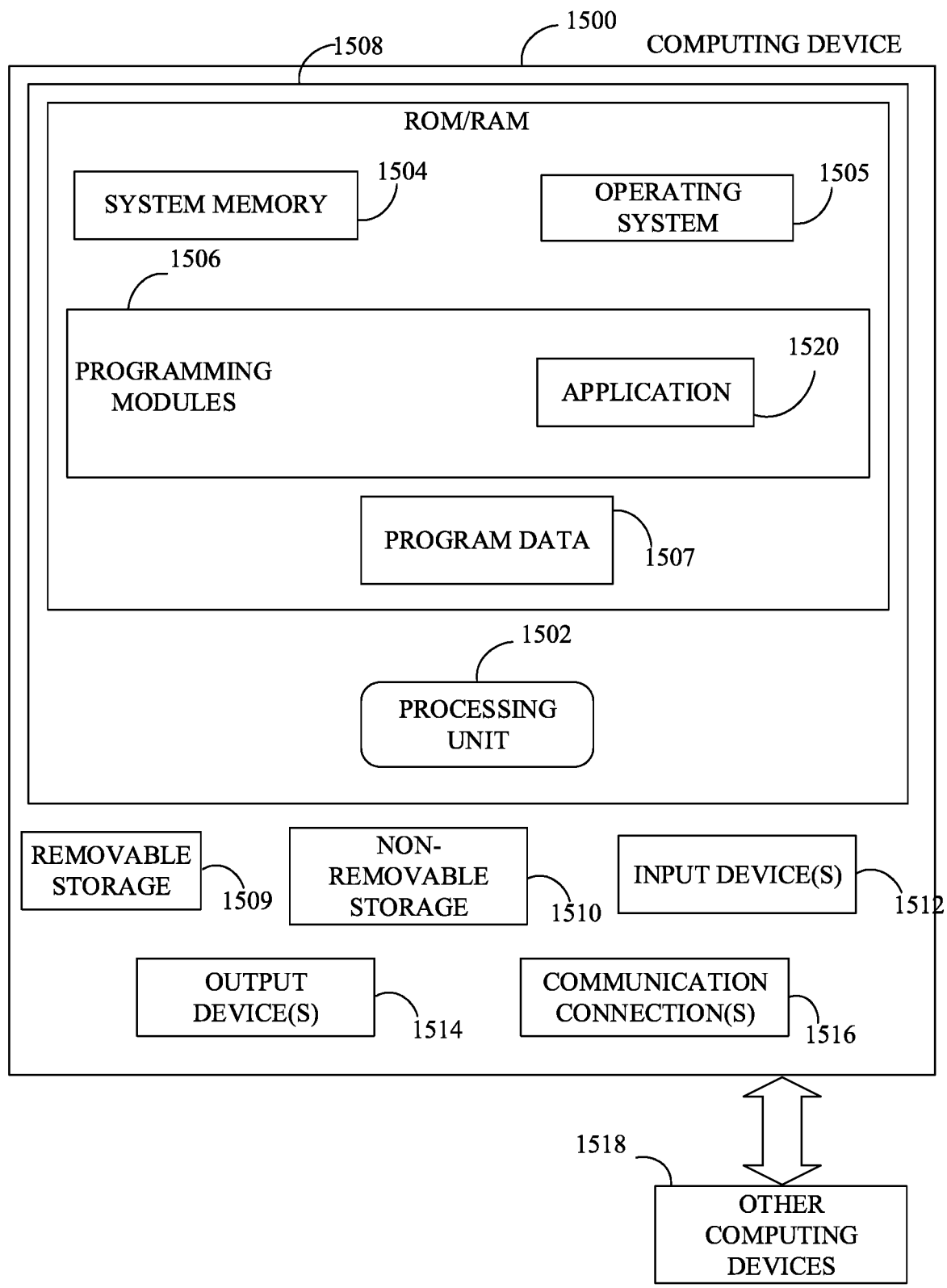
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning application etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

What is claimed is:

1. An apparatus for manufacturing an optical fiber connector termination, the apparatus comprising:
   a resin dispenser configured for dispensing a resin, wherein the resin dispenser comprises a resin dispenser outlet configured to be coupled with a resin inlet of a molded part, wherein the resin dispenser is configured for dispensing the resin utilizing electrical energy;
   a vacuum generator configured for generating a negative pressure, wherein the vacuum generator comprises a vacuum generator outlet configured to be coupled to at least one vacuum outlet of the molded part, wherein the vacuum generator is configured for generating the negative pressure utilizing electrical energy; and
   a controller electrically coupled to each of the resin dispenser and the vacuum generator, wherein the controller is configured for controlling operation of the resin dispenser and the vacuum generator, wherein controlling operation of the vacuum generator is based on at least one characteristic of the resin.

2. The apparatus of claim 1 further comprising a laser generator configured for generating a laser beam directed towards the resin inlet of the molded part, wherein the laser beam is configured to facilitate curation of the resin, wherein the laser generator is configured for generating the laser beam utilizing electrical energy, wherein the controller is electrically coupled to the laser generator, wherein the controller is further configured for controlling operation of the laser generator.

3. The apparatus of claim 1, wherein the molded part comprises a ferrule comprising a micro-hole structure.

4. The apparatus of claim 1, wherein the resin dispenser comprises a solenoid driven syringe, wherein the syringe comprises the resin dispenser outlet, wherein the resin dispenser outlet comprises a dispenser tip.

5. The apparatus of claim 1 further comprising a storage device comprising operation data corresponding to at least one characteristic of the resin, wherein the controller is communicatively coupled to the storage device.

6. The apparatus of claim 5, wherein the at least one characteristic comprises a viscosity, wherein the viscosity of the resin is based on an age of the resin, wherein the storage device comprises a plurality of vacuum time periods corresponding to a plurality of ages of the resin, wherein the controller is further configured for:
   determining the age of the resin based on a time elapsed since a refilling operation associated with the resin, wherein the refilling operation comprises introducing the resin into a resin compartment of the resin dispenser; and
   retrieving the vacuum time period from the storage device based on the age.

7. The apparatus of claim 5, wherein the controller is configured for:
   activating the resin dispenser for a dispensing time period based on the operation data; and
   activating the vacuum generator for a vacuum time period based on the operation data, wherein the activating of the vacuum generator is initiated upon an end of the dispensing time period.

8. The apparatus of claim 5 further comprising an input device configured for receiving a resin identifier associated with the resin, wherein the input device is communicatively coupled with the controller, wherein the storage device comprises a plurality of characteristics corresponding to a plurality of resin identifiers associated with a plurality of resins, wherein the plurality of resin identifiers comprises the resin identifier, wherein the controller is configured for retrieving the at least one characteristic of the resin from the storage device based on the resin identifier.

9. The apparatus of claim 1 further comprising at least one sensor configured for sensing the at least one characteristic of the resin, wherein the controller is communicatively coupled to the at least one sensor.

10. An apparatus for manufacturing an optical interconnect configured for interconnecting a first optical system to a second optical system, the apparatus comprising:
    a resin dispenser configured for dispensing a resin, wherein the resin comprises epoxy resin, wherein the resin dispenser comprises a resin dispenser outlet configured to facilitate injection of the resin into a resin inlet of a molded part, wherein the molded part comprises a ferrule comprising a micro-hole structure, wherein the resin dispenser outlet comprises a dispensing tip, wherein the resin dispenser is configured for dispensing the resin utilizing electrical energy;
    a vacuum generator configured for generating a negative pressure, wherein the vacuum generator comprises a vacuum generator outlet configured to be coupled to at least one vacuum outlet of the molded part, wherein the vacuum generator is configured for generating the negative pressure utilizing electrical energy;
    a laser generator configured for generating a laser beam directed towards the resin inlet of the molded part, wherein the laser beam is configured to facilitate curation of the resin, wherein the laser generator is configured for generating the laser beam utilizing electrical energy;
    a storage device comprising operation data corresponding to at least one characteristic of the resin;
    a controller electrically coupled to each of the resin dispenser, the vacuum generator, the laser generator and the storage device, wherein the controller is configured for controlling operation of the resin dispenser and the vacuum generator, wherein controlling operation of the vacuum generator is based on the at least one characteristic of the resin, wherein the at least one characteristic comprises viscosity, wherein the controller is configured for:
      activating the resin dispenser for a dispensing time period based on the operation data; and
      activating the vacuum generator for a vacuum time period based on the operation data, wherein the activating of the vacuum generator is subsequent to the activating of the resin dispenser; and
    a power connector configured to be electrically coupled with an electrical power source configured for providing electrical energy to operate each of the resin dispenser, the vacuum generator, the storage device and the controller.

11. The apparatus of claim 10, wherein the electrical power source is electrically coupled to the resin dispenser through a dispenser relay, wherein the controller is further electrically coupled to the dispenser relay, wherein activating the resin dispenser comprises activating the dispenser relay, wherein the electrical power source is electrically coupled to the vacuum generator through a vacuum relay, wherein the controller is further electrically coupled to the vacuum relay, wherein activating the vacuum generator comprises activating the vacuum relay, wherein the electrical power source is electrically coupled to the laser generator through a laser relay, wherein the controller is further electrically coupled to the laser relay, wherein activating the laser generator comprises activating the laser relay.

12. The apparatus of claim 10 further comprising an imaging device configured for capturing an image of a front face of the ferrule, wherein the imaging device comprises a camera, wherein the imaging device is communicatively coupled to the storage device, wherein the controller is further configured for:
   analyzing the image, wherein the image is captured subsequent to the activating of the vacuum generator;
   determining formation of a resin bead on the front face of the ferrule based on the analyzing; and
   deactivating the vacuum generator based on determining the formation of the resin bead.

13. The apparatus of claim 10 further comprising an input device configured for receiving a resin identifier associated with the resin, wherein the storage device comprises a plurality of characteristics corresponding to a plurality of resin identifiers associated with a plurality of resins, wherein the plurality of resin identifiers comprises the resin identifier, wherein the controller is configured for retrieving the at least one characteristic of the resin from the storage device based on the resin identifier.

14. The apparatus of claim 10 further comprising an output device configured for presenting operational data corresponding to the apparatus.

15. The apparatus of claim 10, wherein the viscosity of the resin is based on an age of the resin, wherein the storage device comprises a plurality of vacuum time periods corresponding to a plurality of ages of the resin, wherein the controller is further configured for:
   determining the age of the resin based on a time elapsed since a refilling operation associated with the resin, wherein the refilling operation comprises introducing the resin into a resin compartment of the resin dispenser; and
   retrieving the vacuum time period from the storage device based on the age.

16. The apparatus of claim 15, wherein the at least one characteristic further comprises a pot-life associated with the resin, wherein the controller is further configured for:
   comparing the age of the resin with the pot-life; and
   deactivating the resin dispenser based on a result of the comparing, wherein
   the result comprises indication of the age exceeding the pot-life.

17. The apparatus of claim 10, wherein the activating of the vacuum generator is subsequent to end of the dispensing time period.

18. The apparatus of claim 10, wherein the controller is further configured for generating a time delay subsequent to end of the dispensing time period, wherein the activating of the vacuum generator is subsequent to elapse of the time delay.

19. The apparatus of claim 10, wherein the storage device further comprises a mode indicator corresponding to a multicycle mode, wherein each cycle of the multicycle mode comprises activating the resin dispenser for the dispensing time period and activating the vacuum generator for the vacuum time period, wherein the controller is configured for:
   retrieving a number of cycles corresponding to the multicycle mode from the storage device;
   determining whether a cycle counter value is equal to the number of cycles; and
   deactivating each of the resin dispenser, the vacuum generator and the laser generator based on the cycle counter value being equal to the number of cycles.

* * * * *